(12) United States Patent
Terzulli

(10) Patent No.: US 12,268,322 B1
(45) Date of Patent: Apr. 8, 2025

(54) BOOSTED HEATING ESPRESSO MACHINE

(71) Applicant: Fellow Industries, Inc., San Francisco, CA (US)

(72) Inventor: Nicholas Terzulli, San Francisco, CA (US)

(73) Assignee: Fellow Industries, Inc., San Francisco, CA (US)

( * ) Notice: Subject to any disclaimer, the term of this patent is extended or adjusted under 35 U.S.C. 154(b) by 0 days.

(21) Appl. No.: 18/617,286

(22) Filed: Mar. 26, 2024

Related U.S. Application Data

(60) Provisional application No. 63/608,242, filed on Dec. 9, 2023.

(51) Int. Cl.
*A47J 31/06* (2006.01)
*A47J 31/44* (2006.01)
*A47J 31/46* (2006.01)
*A47J 31/52* (2006.01)

(52) U.S. Cl.
CPC ....... *A47J 31/0663* (2013.01); *A47J 31/4489* (2013.01); *A47J 31/461* (2018.08); *A47J 31/465* (2013.01); *A47J 31/468* (2018.08); *A47J 31/5253* (2018.08)

(58) Field of Classification Search
CPC .. A47J 31/0663; A47J 31/461; A47J 31/5253; A47J 31/468; A47J 31/4489; A47J 31/465
See application file for complete search history.

(56) References Cited

U.S. PATENT DOCUMENTS

| | | | |
|---|---|---|---|
| 9,623,519 B1* | 4/2017 | Fedele | B23P 15/16 |
| 2014/0305313 A1* | 10/2014 | Waldron | A47J 31/469 |
| | | | 99/290 |
| 2019/0380530 A1* | 12/2019 | Mueller | A47J 31/007 |
| 2020/0029729 A1* | 1/2020 | Coleman | A47J 31/54 |
| 2022/0330743 A1* | 10/2022 | Almagor | A47J 31/461 |
| 2023/0233013 A1* | 7/2023 | Chen | A47J 31/0663 |
| | | | 99/279 |
| 2024/0156298 A1* | 5/2024 | Hugi | A47J 31/41 |
| 2024/0215753 A1* | 7/2024 | Besse | A47J 31/4485 |
| 2024/0335058 A1* | 10/2024 | Stamm | A47J 31/18 |

* cited by examiner

*Primary Examiner* — Steven W Crabb
*Assistant Examiner* — Keith Brian Assante
(74) *Attorney, Agent, or Firm* — Cognition IP, P.C.; Edward Steakley; Justin White

(57) ABSTRACT

An espresso machine can include a pump, preheating component, low volume boiler, and group head. The pump can provide pressurized water to the preheating component, which can preheat the pressurized water to a first temperature and deliver the preheated water. The low volume boiler can have a heating arrangement, water inlet, internal volume, and water outlet, and can receive the preheated water, heat the preheated water to a second temperature that is equal to or greater than the first temperature, and deliver a portion of the heated water. The group head can couple with a portafilter having espresso grounds therein, receive the portion of heated water from the low volume boiler, and force the portion of heated water through the espresso grounds in the portafilter. The portion of heated water can remain substantially at or within about 1° C. of the second temperature as it exits the group head.

23 Claims, 11 Drawing Sheets

BOOSTED HEATING ESPRESSO MACHINE

CROSS-REFERENCE TO RELATED APPLICATION

This application claims priority to U.S. Provisional Patent Application No. 63/608,242, filed on Dec. 9, 2023, and titled "BOOSTED HEATING ESPRESSO MACHINE," which is hereby incorporated herein by reference in its entirety.

TECHNICAL FIELD

The present disclosure relates generally to coffee making equipment, and more particularly to espresso machines and systems.

BACKGROUND

Espresso is a concentrated form of coffee produced by forcing hot water under high pressure through finely ground coffee beans that is typically made in small portions or "shots." Sophisticated machines and systems suitable for "pulling shots" to provide high quality espresso drinks in commercial environments are well known and tend to be prohibitively expensive for ordinary home and other small scale use. Commercial espresso machines include many items arranged together to precisely control the temperature, pressure, flow, and delivery of hot water to result in consistent high quality shots of espresso. Alternative or lesser versions of these items are often used in providing smaller and cheaper espresso machines that are suitable for home use.

Such small scale espresso machines cannot leverage the sophistication and expense of commercial espresso machines, however, such that these lesser machines cannot pull consistent commercial quality espresso shots. One issue involves controlling brew temperature throughout the pull of an espresso shot. A temperature that is too low results in a weak and underextracted or underdeveloped shot, while one that is too high or rises over the pull of the shot results in overextraction and a burned or unpleasant flavor. Unfortunately, very fine thermal control and stability is difficult to achieve when various espresso machine components are relatively smaller, cheaper, and simpler.

Although traditional home espresso machines and systems have worked well in the past, improvements are always helpful. In particular, what is desired are espresso machine and system architectures with better thermal stability that are suitable for home or small scale use.

SUMMARY

It is an advantage of the present disclosure to provide improved espresso machine and system architectures with better thermal stability that are suitable for home or other small scale use. The disclosed espresso machines and systems allow for improved thermal stability without using traditional commercial architectures and components that are relatively large, expensive, and impractical for small scale use. These advantages can be accomplished at least in part by using an espresso machine or system architecture having a "boosted" heating arrangement. This can include a preheating component that preheats water for another heating component that heats the water further and outputs hot water at a high level of thermal stability, such as a thermoblock that preheats and feeds water into a small capacity boiler and/or heated group head, for example.

In various embodiments of the present disclosure, an espresso machine can include a main body, pump, preheating component, low volume boiler, and group head. The main body can have an outer housing and internal components contained therein. The pump can be configured to provide pressurized water through the main body. The preheating component can be located within the main body and arranged to receive the pressurized water from the pump. The preheating component can be configured to preheat the pressurized water to a first temperature and to deliver the preheated water. The low volume boiler can be located within the main body and can have a heating arrangement, a water inlet, an internal volume, and a water outlet. The low volume boiler can be configured to receive the preheated water from the preheating component at the water inlet, to heat the preheated water within the internal volume to a second temperature that is equal to or greater than the first temperature using the heating arrangement, and to deliver a portion of the heated water out of the water outlet. The group head can be located proximate the main body and can be arranged to couple with a portafilter having espresso grounds therein, to receive the portion of heated water from the low volume boiler, and to force the portion of heated water through the espresso grounds in the portafilter. The portion of heated water can remain substantially at or within about 1° C. of the second temperature as it exits the group head.

In various detailed embodiments, the low volume boiler can have an internal volume of about 250 mL or less. The first temperature can be between about 50-100° C. and the second temperature can be between about 85-100° C. In some arrangements, the first temperature can be between about 90-96° C. and the second temperature can be between about 91-97° C. In more specific embodiments, the first temperature can be about 93° C. and the second temperature can be about 94° C. The preheating component can be a thermoblock or other suitable flash fluid heating device. The heating arrangement of the low volume boiler can include a heating element, a temperature sensor, a feedback loop, and a controller. The group head can include a heating element configured to preheat the group head and portafilter before the portion of heated water is delivered thereto. The heating element of the group head can be further configured to heat the group head to substantially maintain the temperature of the portion of heated water passing therethrough. In various embodiments, the espresso machine can further include a water reservoir coupled to the pump and configured to store water therein and provide the water to the pump, an overpressure valve coupled to the water reservoir and the pump and configured to regulate the pressure of the water provided by the pump, and a flowmeter configured to measure water flow from the water reservoir to the pump. The espresso machine can also include a multiway valve located between and coupled to both the preheating component and the low volume boiler, and this multiway valve can be configured to allow a partial diversion of the preheated water from the preheating component. A steam wand can be coupled to the multiway valve and configured to receive the partial diversion of preheated water.

In various further embodiments of the present disclosure, an espresso producing system can include a pump, a first flash fluid heating device, and a group head. The pump can be configured to provide pressurized water. The first t flash fluid heating device can be arranged to receive the pressurized water from the pump and can be configured to preheat the pressurized water to a first temperature and to deliver the preheated water. The group head can be arranged to couple with a portafilter having espresso grounds therein, to receive the preheated water from the first flash fluid heating device, and to force the water through the espresso grounds in the portafilter. The group head can include a heating element configured to heat the preheated water within the group head to a second temperature that is equal to or greater than the first temperature such that the heated water remains substantially at or within about 1° C. of the second temperature as it exits the group head.

In various detailed embodiments, the system can further include a water reservoir coupled to the pump and configured to store water therein and to provide the water to the pump, an overpressure valve coupled to the water reservoir and the pump and configured to regulate the pressure of the water provided by the pump, and a flowmeter configured to measure water flow from the water reservoir to the pump. In some arrangements, the system can further include a multiway valve located between and coupled to both of the first flash fluid heating device and the group head, wherein the multiway valve is configured to allow a partial diversion of the preheated water from the first flash fluid heating device, as well as a steam wand coupled to the multiway valve and configured to receive the partial diversion of preheated water. In alternative arrangements, the system can further include a multiway valve located between and coupled to both of the pump and the first flash fluid heating device, wherein the multiway valve is configured to allow a partial diversion of the pressurized water from the pump, a second flash fluid heating device arranged to receive the partial diversion of pressurized water from the multiway valve, wherein the second flash fluid heating device is configured to heat the partial diversion of pressurized water independently of the first flash fluid heating device, and a steam wand coupled to the second flash fluid heating device and configured to receive the heated partial diversion of water from the second flash fluid heating device.

In still further embodiments of the present disclosure, various methods of preparing an espresso beverage are provided. Pertinent process steps can include pumping water, preheating the water, delivering the preheated water, heating the preheated water, and forcing a portion of the heated water through espresso grounds. The water can be pumped into a preheating component, where the water can be preheated to a first temperature that is at or above about 90° C. The preheated water can be delivered from the preheating component into a main heating component, where the preheated water can be heated to a second temperature that is equal to or greater than the first temperature. The portion of heated water from the main heating component can remain substantially at or within about 1° C. of the second temperature as it is forced through the espresso grounds.

In various detailed embodiments, the preheating component can be a thermoblock, thermocoil, or thick film flash heater. The main heating component can be a boiler having an internal volume of about 250 mL or less. Additional process steps can include providing the heated water from the main heating component into a group head before forcing the heated water through espresso grounds, as well as preheating the group head before providing the heated water into the group head. In some arrangements, the main heating component can be a heated group head. The first temperature can be between about 50-100° C. and the second temperature can be between about 85-100° C., among other possible temperatures and ranges. In various arrangements, some or all of the foregoing process steps can be performed automatically.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed systems, apparatuses, features, and methods of use for boosted heating espresso machines and systems. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure.

It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to systems, apparatuses, features, and methods for the preparation of espresso beverages. In particular, the disclosed espresso machines, systems, and architectures provide better thermal stability in products that can produce high quality espresso shots relatively quickly and are also suitable for home or small scale use. These advantages can be realized by way of boosted heating arrangements that can include one or more preheating components that preheat water for main heating components that heat the water further and output sufficiently hot and thermally stable water for an espresso shot.

Although the various embodiments disclosed herein focus on specific espresso machine and system architectures for purposes of simplicity in illustration, it will be readily appreciated that the disclosed systems, apparatuses, and features can similarly be used for other espresso machine and system arrangements, as well as for any type of device or system that can leverage any use for heated fluid outputs that are provided quickly and at very thermally stable temperatures. For example, the disclosed systems, apparatuses and features can be used for preparing other forms of coffees, various teas, and other heated beverages or fluid products. Other applications and extrapolations of the disclosed embodiments are also possible.

Figure 1:
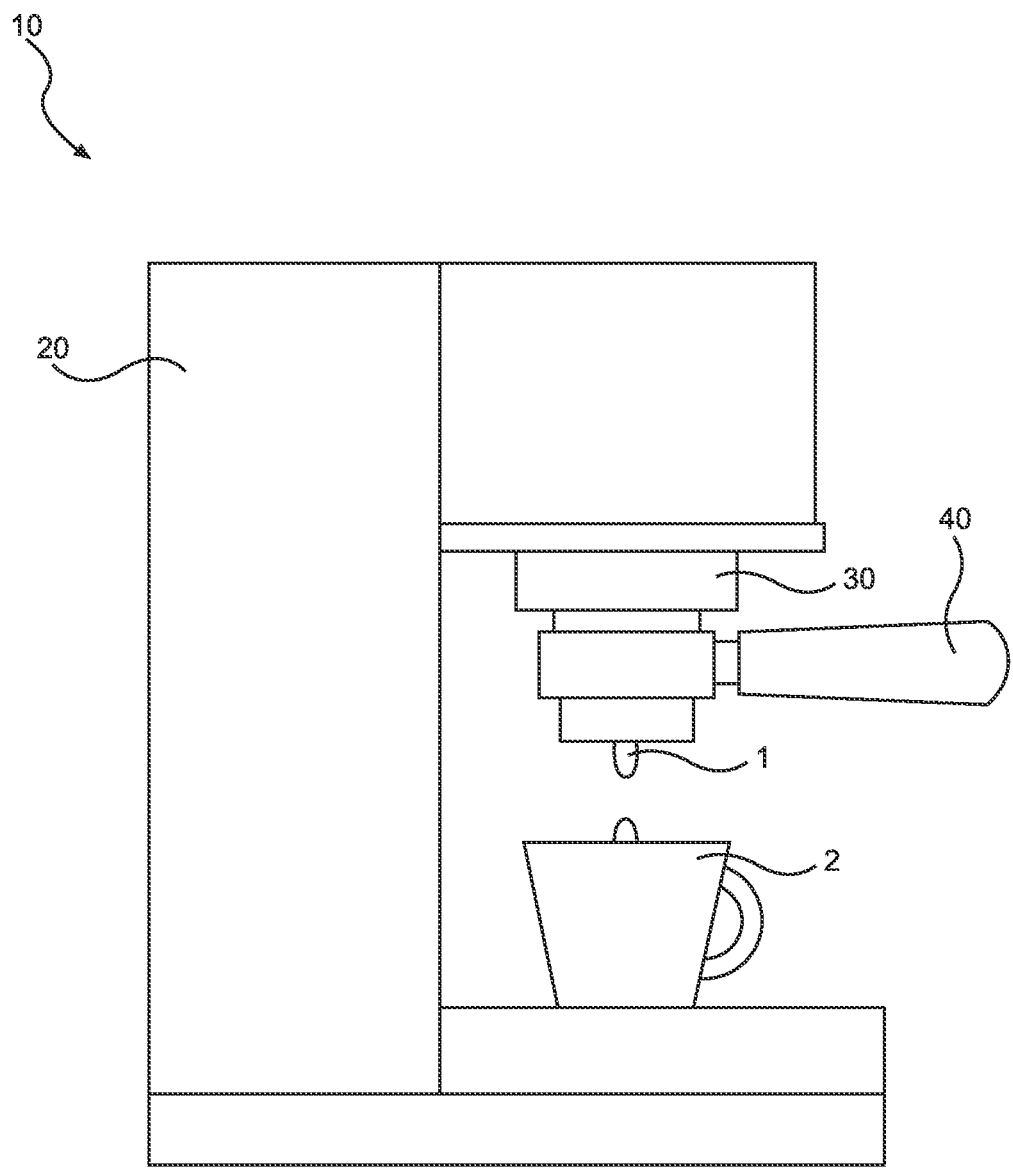
FIG. 1 illustrates in front perspective view an example espresso machine.

Referring first to FIG. 1, an example espresso machine is shown in front perspective view. Espresso machine 10 can include a main body 20 having an outer housing and various internal components contained therein, a group head 30 extending from the main body, and a portafilter 40 removably coupled to the group head, among other possible items. Internal components (not shown) located at various locations within main body 20 can include a water reservoir, pump, and one or more boilers or other heating components, as well as various water lines, valves, gauges, gaskets, and other items. These components and items can combine to pump, pressurize, and heat water from the water reservoir through the pump, boiler, and group head 30 and into the portafilter 40, where the pressurized hot water meets espresso grounds in the form of a "coffee puck" within the portafilter to form an espresso shot. Espresso 1 can then drip from the portafilter 40 down into a cup 2 or other container that can hold the full espresso shot. Other features and details of an espresso machine and espresso shot formation are known and understood by those of skill in the art.

As is also generally well known, sophisticated commercial espresso machines tend to have a large boiler or even multiple large boilers that can be used to heat and deliver water at precise and stable temperatures. While large boilers tend to be very good at providing hot water at precise and stable temperatures, use of large boilers does have drawbacks. For example, heat up times for 2 liter or larger boilers can be up to 45 minutes to an hour or more to bring water therein from room temperature to reach full thermal stability throughout the machine at the levels needed to brew espresso (e.g., 90° C. or more). This can be very inefficient where only one or a few shots of espresso at a time are desired, both in terms of energy consumption to heat large quantities of water and in the cost of buying and maintaining a large boiler based device. To create cheaper and less sophisticated systems suitable for home and other small scale use, smaller boilers or other alternative heating components tend to be used. Alternative small scale heaters for low budget espresso machines include flash fluid heating devices such as thermoblocks, thermocoils, thick film flash heaters, and the like.

Thermoblock and other flash heating based espresso machines traditionally have fast start or "heat up" times but are deficient in terms of thermal stability, particularly where their group heads are not heated or saturated. This can lead to thermal instability of the coffee puck within the portafilter with regard to the applicable machine control system, as the group head and portafilter initially act as a heat sink for the first few espresso shots pulled during any machine use. These types of low budget espresso machines usually do not reach a reasonable thermal equilibrium until 4 or more shots of espresso (or blank hot water shots) are pulled through the group head and portafilter, which then warms these items to a steady state temperature.

Figure 2:
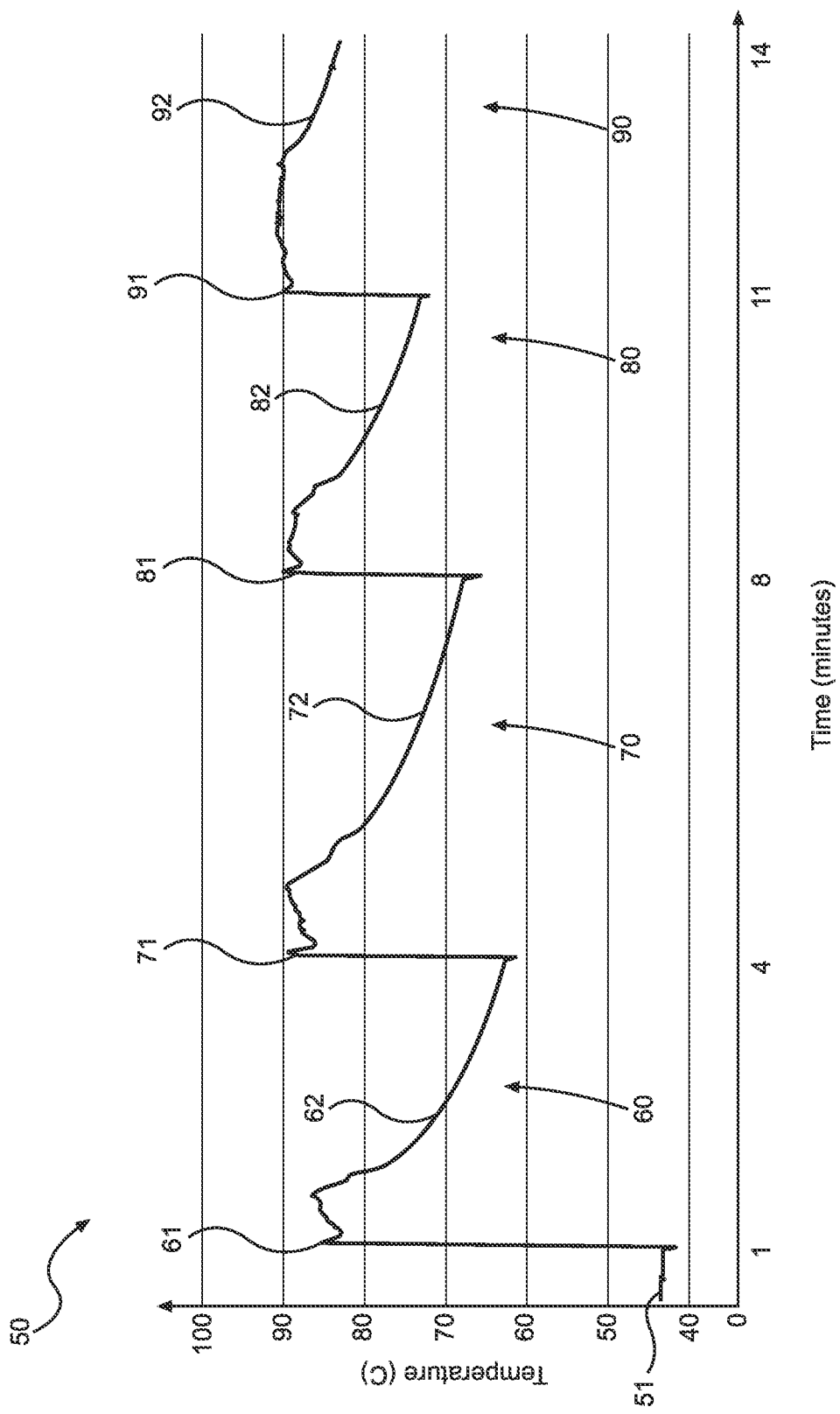
FIG. 2 illustrates a graph of an example temperature profile over time for multiple espresso shots pulled in succession using a simple thermoblock espresso machine.

Turning to FIG. 2, a graph is provided for an example temperature profile over time for multiple espresso shots pulled in succession using a simple thermoblock espresso machine. Graph 50 demonstrates what commonly happens when the first few shots are pulled through a simple thermoblock or other flash fluid heating type of espresso machine, which is a simple machine that does not have any other heating element, such as a heated group head. The specific data shown in graph 50 was taken and recorded with a SCACE thermofilter with a data acquisition system on a simple thermoblock based espresso machine, and it will be understood that this data may vary over separate runs and on different machines. Temperature profile line 51 represents the temperature of water within the machine portafilter over time as four espresso shots 60, 70, 80, 90 are pulled on the machine. Each shot 60, 70, 80, 90 was pulled over a 3-4 minute period, and shots were pulled in rapid succession on the same machine.

As shown, temperature initially spiked at the start of each shot 61, 71, 81, 91 as hot water was first pulled into the portafilter from the group head. Temperature declined over the remaining shot duration 62, 72, 82, 92, however, as the group head and portafilter combined to initially act as a heat sink to lower the water temperature until these items warmed up over time. As will be readily appreciated, temperature decline 62 in first shot 60 is terrible and will result in a very poor quality shot of espresso. Although improved, the temperature declines 72, 82 of the next two shots 70, 80 are also bad and will also result in poor espresso shots. The temperature decline 92 of the fourth shot 90 is better and could result in decent espresso, and this overall temperature profile 51 should continue to improve over subsequent shot pulls.

The temperature of water delivered to an espresso puck within the portafilter should generally be high enough for proper brewing and must be either stable or slightly declining in profile over the shot duration to result in good quality espresso. A rise in temperature profile over a shot pull can lead to issues with extraction, such as a resulting release of chlorogenic acid and other undesirable compounds that will make the resulting espresso taste bad. Thus, the temperature profile of shot 90 is the first one in the illustrated series that could result in a high quality shot of espresso. Unfortunately, the first three shots 60, 70, 80 are essentially wasted. This problem is common every time a flash fluid heating based budget espresso machine is turned on and initially operated until things are all heated.

Other types of problems exist for inexpensive espresso machines that are not flash fluid heating based. For example, traditional single boiler based espresso machines have serious limitations of time and temperature fluctuations when switching between brewing and steaming. Inexpensive single boiler espresso machines are typically controlled on the boiler by a bimetallic strip in the brew circuit, with this arrangement typically being very inaccurate. This can require cooling flushes to put the group head and boiler water to the correct temperature and/or significant modifications, such as using an after-market PID control kit to replace the bimetallic strip with an RTD along with adding a solid state relay in the control loop. Switching to steam for an inexpensive single boiler machine is also an issue, as one needs to wait for the single boiler to heat and build pressure for the steam, further throwing off the thermal stability of the overall system for pulling shots. In addition, the single boiler for these machines needing to handle both steaming and brewing typically results in a boiler size is relatively large, which then results in longer heat up times like for some commercial machines.

Another type of inexpensive espresso machine involves the use of a heat exchanger, which is essentially a single boiler that runs at steam pressure and then has a coil inside to heat water from the water tank up to brewing temperature which is then fed through the group head. These are notorious for running hot, as water can stay inside the coil indefinitely, thus needing multiple cooling flushes to reach proper temperature. The added time and effort to run these types of machines, as well as the increased waste of water, can be significant drawbacks.

Traditional dual boiler espresso machines are the most thermally stable of the various types of inexpensive espresso machines. The use of two independent boilers typically provides for independently controlled boiler temperatures that can allow for steaming and pulling shots at the same time and can also result in greater thermal stability compared to single boilers that must toggle back and forth between steam temperatures and brewing temperatures. Unfortunately, even inexpensive dual boiler machines still need significant amounts of time to heat up both the brew boiler and the steam boiler, and ultimately do not reach a solid thermal equilibrium until at least 20-30 minutes after starting up.

Figure 3:
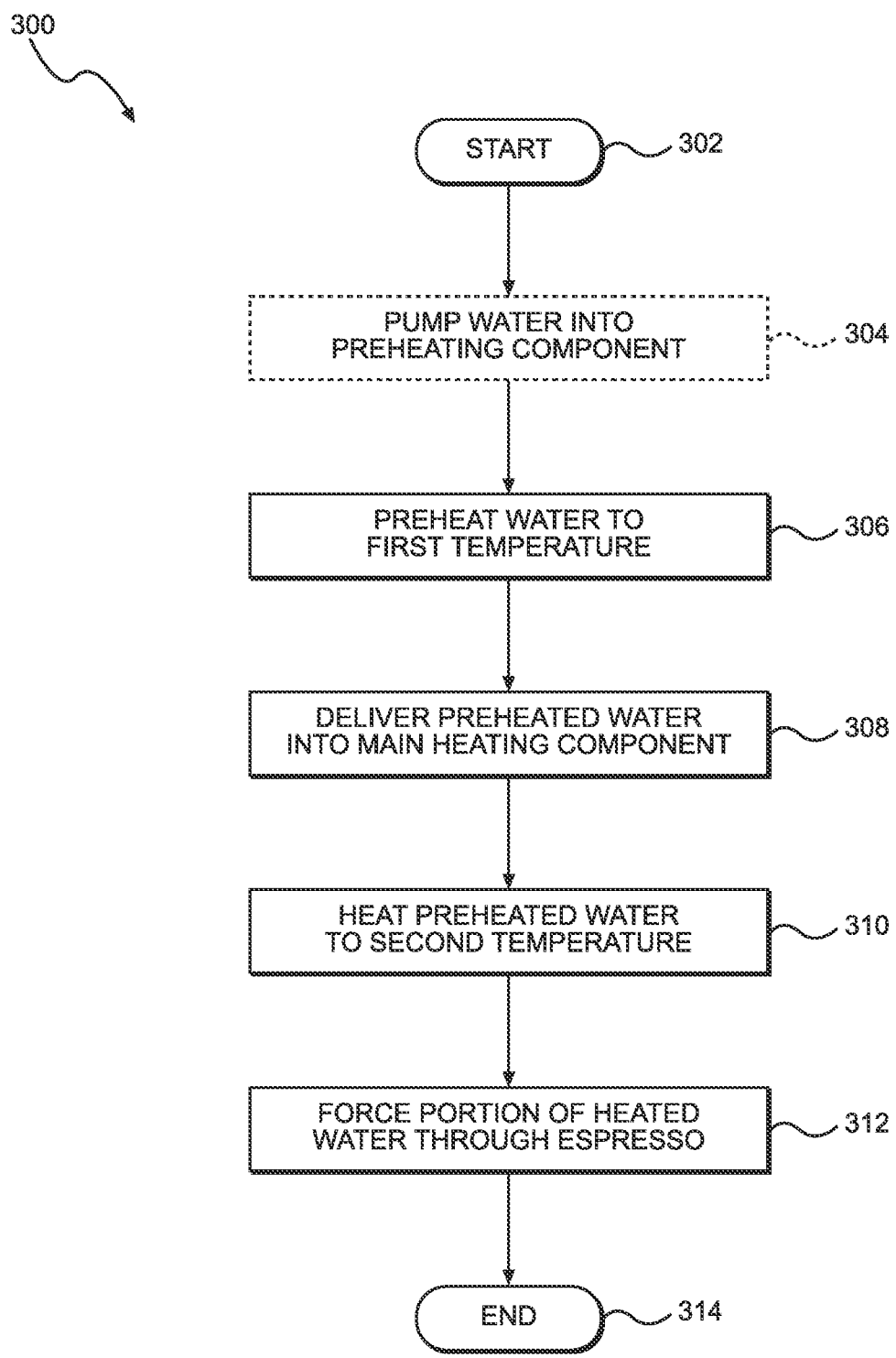
FIG. 3 illustrates a flowchart of an example summary method of preparing an espresso beverage according to one embodiment of the present disclosure.

The foregoing problems can be overcome or at least minimized by using one or more of the various boosted heating espresso machine features and architectures provided herein, which can result in a more thermally stable espresso preparation in an inexpensive espresso machine or system that also has a relatively fast start up time. Turning now to FIG. 3, a flowchart of an example summary method of preparing an espresso beverage is provided. Summary method 300 can represent a broad overview of steps performed by an espresso machine or other suitable system, and it will be understood that various other steps, features, and details of such a broad overview method are not provided here for purposes of simplicity. Some or all of the steps in summary method 300 can be performed automatically by the espresso machine or system, and it will be understood that other steps and functions of an overall method of preparing an espresso beverage can be conducted manually by a user who is using the espresso machine or system.

After a start step 302, a first optional process step 304 can involve pumping water into a preheating component at the espresso machine or system. This can also involve pressurizing the pumped water, as will be readily appreciated. Optional process step 304 can be automatically performed by the espresso machine or system, such as by a water pump or other typical water providing arrangement that may also include a water reservoir, flow meter, and overpressure valve. In some arrangements, summary method 300 can be performed using water that is already in the preheating component such that pumping might be avoided.

At a following process step 306, the water can be preheated to a first temperature, which can be done within the preheating component. Process step 306 can be automatically performed by the espresso machine or system, such as by an automatically run thermoblock or other flash fluid heating element. This can involve preheating the water to a first temperature that is at or above about 90° C., for example, although other temperatures are also possible.

At the next process step 308, the preheated water can be delivered into a main heating component. Process step 308 can be automatically performed by the espresso machine or system, such as by fluid delivery or feed lines that couple the preheating component to the main heating component and pressure from the pump that forces the water through the preheating component and the fluid delivery lines. This can involve a continuous flow of pressurized water from the pump and through the preheating component and all fluid feed lines.

At a subsequent process step 310, the preheated water can be heated to a second temperature, which can be done within the main heating component. Process step 310 can be automatically performed by the espresso machine or system, such as by an automatically run small or low volume boiler or other similar component. This can involve heating the water to a second temperature that is equal to or greater than the first temperature. This second temperature can be between about 91-97° C., for example, although other temperatures are also possible. In particular, the main heating component can effectively serve as both a heating component and thermally stabilizing component, such that the water temperature input to it from the preheating component can fluctuate several degrees up and down, the water temperature exiting the main heating component is much more thermally stable.

At a following process step 312, a portion of the heated water can be forced through espresso grounds. This can involve releasing the portion of heated water from the main heating component through a feed line into a group head and through the group head into a portafilter having a coffee puck formed therein, for example. The portion of heated water can have the volume of a typical espresso shot or any other suitable volume. Process step 312 can be automatically performed by the espresso machine or system, such as by an automatically run shot pulling subsystem that may include a valve, group head, portafilter, and other typical espresso machine items. In some arrangements, the portion or "shot" of heated water can remain substantially at or within about 1° C. of the second temperature as it is forced through the espresso grounds, although other temperature declines and ranges are also possible. This can be due to the improved thermal stability in the exit temperature from the main heating component as well as one or more other factors, such as a preheated group head and portafilter arrangement, for example. Summary method 300 can then end at end step 314.

For the foregoing summary method 300, it will be appreciated that not all steps are necessary and that other steps and details may be added. For example, an additional process step can involve heating the group head and portafilter prior to forcing the portion of heated water therethrough. Furthermore, the order of steps may be altered in some cases, and some steps may be performed simultaneously. For example, steps 304-312 may be performed simultaneously in some arrangements, such as where continuous pumping, heating, and forcing all occur during a repeated series of espresso shot pulls. Other possible process steps and details are provided in further examples below, and variations and extrapolations of method 300 will be readily appreciated by those of skill in the art.

Figure 4A:
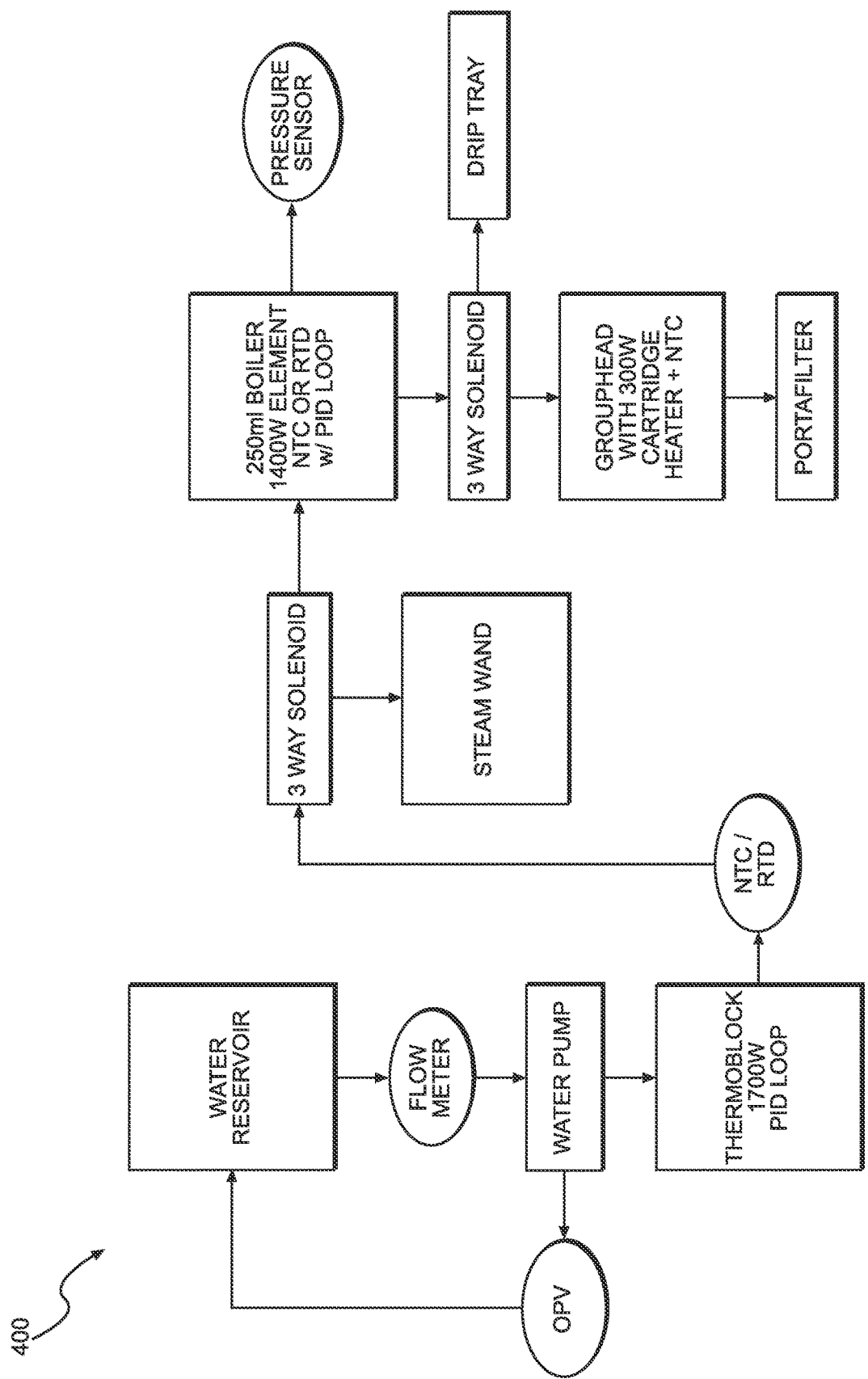
FIG. 4A illustrates a schematic diagram of an example boosted heating espresso machine having a low volume boiler according to one embodiment of the present disclosure.

Transitioning to FIG. 4A, a schematic diagram is provided of an example boosted heating espresso machine having a low volume boiler. Boosted heating espresso machine 400 can have a general architecture that combines the advantages of the thermal stability of a boiler with the "heat on the fly" fast heat up ability of a thermoblock or other flash fluid heating device. To ensure thermal stability on even the first shot of espresso pulled, in some embodiments the group head and portafilter can be preheated prior to pulling the first shot therethrough, such as by using a small cartridge heater inserted into the group head.

As shown, boosted heating espresso machine 400 can include a water reservoir, flow meter, water pump, and overpressure valve arranged in a suitably operating combination prior to a preheating component (e.g., thermoblock). These items can be included within or proximate a main body or other relevant portion of the espresso machine, such as within an outer housing, although other suitable arrangements may also be possible. For example, the water reservoir can be a separate unit located outside the main body or could even be an alternative water source. Each of the following items can similarly be included within or proximate the main body of the espresso machine as would be readily expected. For example, the preheating component, main heating component, and multiway valves can be located within the main body, while the steam wand, group head, portafilter, and drip tray can be located outside but proximate the main body at typically expected locations for such items.

A thermoblock or other suitable flash fluid heating device can serve as a preheating component that initially intakes water from the pump. This preheating component can be arranged to preheat the water to a first temperature that is at or close to the temperature needed to brew espresso, such as at or above about 90° C., for example. In some arrangements, the first temperature can be as low as about 50° C. so that at least some boosted heating amount is provided, and the first temperature can be as high as boiling in other arrangements, such that an overall range of between about 50-100° C. might be possible for the first temperature. In some situations, the first temperature might be lower due to a lower desired brew temperature for a darker roast espresso, such that temperatures in the range of between about 80-90° C. can be used. Other first temperatures and temperature ranges are also possible.

In one example, a thermoblock with a 1700 watt heating element can be used as a preheating component or device. A proportional-integral-derivative ("PID") control loop can be used with the thermoblock or other flash fluid heating device to modulate control of the device temperature, for example, although other suitable temperature control mechanisms may alternatively be used. A temperature sensor such as a negative temperature coefficient thermistor ("NTC") or resistance temperature detector ("RTD") can be used to monitor the temperature of water exiting the preheating device.

A multiway valve can be located between and coupled to both of the preheating component and a low volume boiler located downstream of the preheating component. This multiway valve can be configured to allow diversion of the preheated water from the preheating component away from the low volume boiler and into a steam wand. As such, this valve can control switching between steaming and brewing functions for the hot water coming from the thermoblock or other flash heating device. In some embodiments, this multiway valve can be a 3-way solenoid valve, although other suitable arrangements are also possible.

A main heating component for brewing can be located downstream of the multiway valve. In some embodiments, the main heating component can include a small or low volume boiler having a heating arrangement, a water inlet, an internal volume, and a water outlet. In one example, a single boiler having an internal volume of about 250 mL can be used. Other boiler volumes can also be used, such as volumes between 200-300 mL and/or between 300-500 mL. It is specifically contemplated that even smaller volume boilers below 250 mL are possible for purposes of the present disclosure. This small volume boiler (which can also be called a low volume boiler) can use a 1400 watt heating element, for example, and can be configured to bring water to a brew ready temperature in less than 1 minute. The small volume boiler or other suitable main heating component can also include a temperature sensor (e.g., an NTC or RTD) and a PID or other suitable control loop, as well as an overpressure valve (e.g., set to 9 bar of pressure, for safety and stability) along with a pressure sensor to create a feedback loop for pressure profiling, as will be readily understood by those of skill in the art.

This small or low volume boiler (or other suitable main heating component) can be configured to receive the preheated water from the preheating component at its water inlet, to heat the preheated water within its internal volume to a second temperature that can be equal to or greater than the first temperature using the heating arrangement, and to deliver a portion (e.g., a shot) of the heated water out of its water outlet. In general, the second temperature of the heated water can be at or about the temperature desired for brewing the espresso. In various arrangements, the second temperature can be between about 85-100° C. for a range of possible desired brew temperatures. Again, the second temperature can be at or somewhat higher than the first temperature, and its actual value can be lower for darker roast espresso and higher for lighter roast espresso. In various arrangements for commonly desired brew temperatures, the first temperature can be between about 90-96° C. and the second temperature can be between about 91-97° C. In more specific embodiments for some desired brew temperatures, the first temperature can be about 93° C. and the second temperature can be about 94° C. Other second temperatures and temperature ranges are also possible, as well as relative differences or range ratios between first and second temperatures, as may be appropriate for different situations.

When the inlet temperature of the small volume boiler is at or about the first temperature, the temperature gradient of water across the boiler will be relatively small as water enters, flows through, is heated within, and exits the boiler. This relatively small temperature gradient can then result in greater control of the water temperature in the boiler and substantially better thermal stability of the heated water that exits the boiler. Even in arrangements where the inlet temperature of preheated water entering the boiler (i.e., first temperature) is not at or very close to the outlet temperature of heated water exiting the boiler (i.e., second temperature), the temperature gradient across the boiler is still advantageously reduced over what that gradient would typically be by merely pumping room temperature water into the boiler.

It is generally known that the thermal stability (i.e., fluid exit temperature) of a thermoblock or other flash fluid heating device is unreliable and can fluctuate up or down several degrees due to the nature of these devices. This boosted heating arrangement can then minimize the poor thermal stability of a flash heater by accepting this fluctuating fluid temperature output of the flash heater into a small boiler or other suitable main heating component and stabilizing the temperature across the relatively small temperature gradient therein to result in a fluid output from the small volume boiler or other main heating component that is highly thermally stable and fluctuates up or down less than about 0.1° C. Because this is done leveraging the fast heat up time of a thermoblock or other flash heating device and a boiler having a small volume, this highly thermally stable result can be realized in just a few minutes, rather than the 30-60 minutes or longer that is traditionally required for the heat up of thermally stable large boiler systems.

Boosted heating espresso machine 400 can also include a heated group head, which can further maximize thermal stability even in the first shot pulled after machine start up. This can involve a small cartridge heater inserted into the group head, such as a 300 watt cartridge heater, although other types and power level heaters can also be used. In such arrangements using a preheating component (e.g., thermoblock) feeding already hot water into a main heating component (e.g., small or low volume boiler) and a heated group head, thermal equilibrium can be reached in as little as 5-10 minutes depending on the thermal masses of the boiler, group head, and portafilter (and espresso puck in some arrangements).

In some arrangements, boosted heating espresso machine 400 can also include another multiway valve between the small volume boiler, the group head, and a standard drip tray, which arrangement can allow an espresso shot to be stopped on time. This multiway valve can also be a 3-way solenoid valve, although other suitable arrangements are also possible. As water is flowing from the boiler to the espresso puck when pulling a shot, switching on this multiway valve can cut flow to the puck and back pressure can suck any remaining water out of the line to the group head and flush into the drip tray. As will be readily appreciated, such an arrangement can allow for stopping a shot pull on time and can also allow for a back flush to keep the espresso machine clean. Although not shown in complete detail, other traditional components and features can also be included in boosted heating espresso machine 400.

Figure 4B:
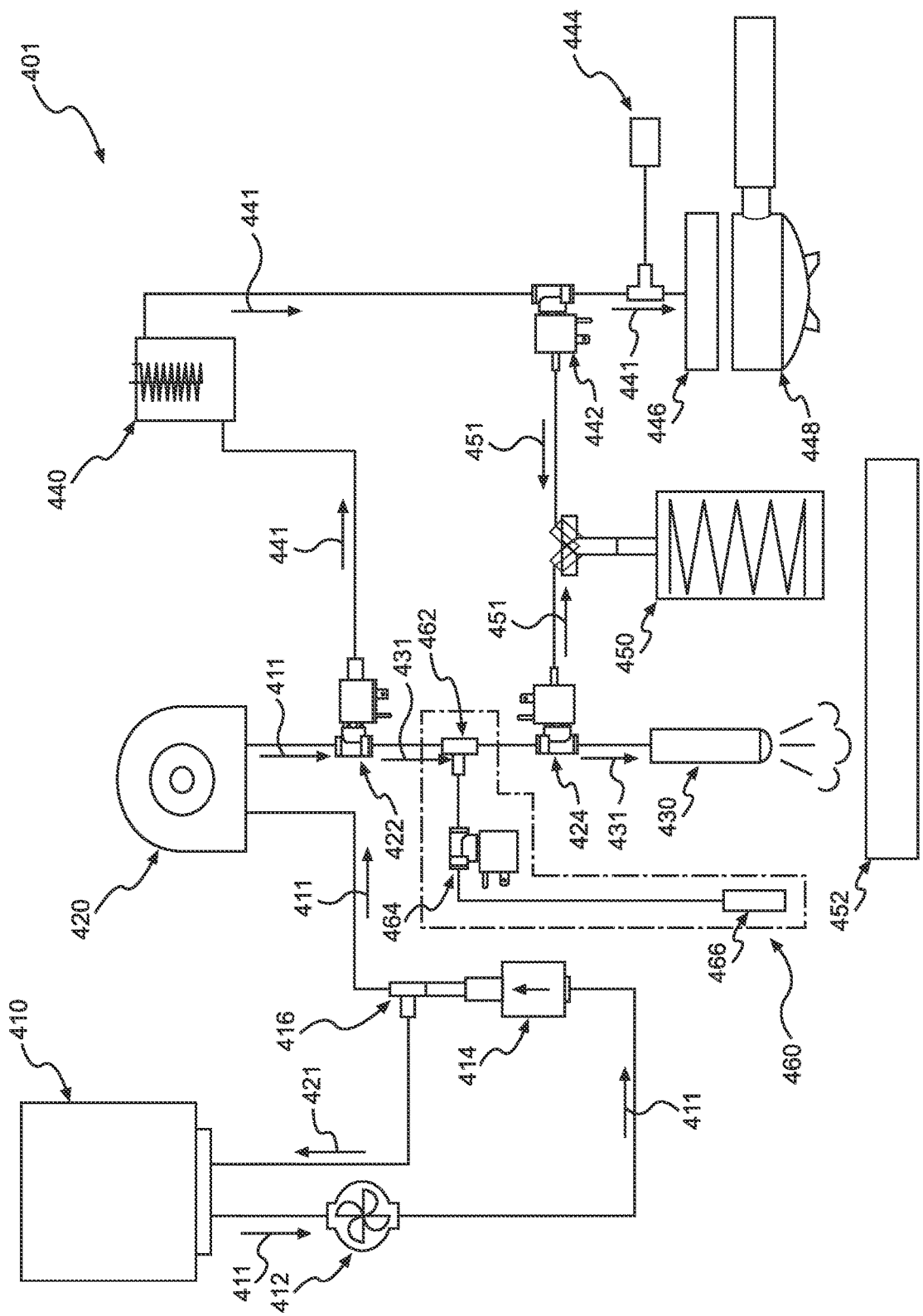
FIG. 4B illustrates a schematic diagram of an example boosted heating espresso machine having a low volume boiler and optional hot water outlet according to one embodiment of the present disclosure.

Continuing with FIG. 4B, a schematic diagram of an example boosted heating espresso machine having a low volume boiler and optional hot water outlet is provided. Boosted heating espresso machine 401 can have a general architecture that is similar in many ways to the embodiment of boosted heating espresso machine 400 set forth above, albeit with some possible changes and/or additions. For example, to ensure thermal stability on even the first shot of espresso pulled, in some embodiments the group head and portafilter of boosted heating espresso machine 401 can be preheated prior to pulling the first shot therethrough, such as by using a small cartridge heater inserted into the group head.

Similar to foregoing embodiment 400, boosted heating espresso machine 401 can include a water reservoir 410, flow meter 412, water pump 414, and overpressure valve 416 arranged in a suitably operating combination prior to any heating components. Initial water supply paths can be represented by water supply lines 411, while a pressure relief water path from overpressure valve 416 back to water reservoir 410 can be represented by pressure relief water line 421.

An initial or primary boosted heating element (i.e., preheating component) 420 can be a thick film thermoblock configured to receive water from overpressure valve 416 and preheat the water to a suitable preheated temperature, as detailed above. In various embodiments, preheating component 420 can also be a thick film heating, thermocoil, or other suitable flash fluid heating device. In some arrangements multiple preheating components can be used. Preheated water can then exit preheating component 420 and enter a line splitting valve or element, such as an initial or first three-way solenoid 422. Other line splitting valves or elements besides a three-way solenoid may alternatively be used in some arrangements. First three-way solenoid 422 can be configured to change or control the water path from water supply line 411 exiting preheating component 420 to coffee function water line 441 that feeds boiler 440 and hot water supply line 431 that feeds hot water splitter 462.

Hot water splitter 462 can route the preheated water from first three-way solenoid 422 to an optional hot water supply unit 460 and another line splitting valve or element, such as second three-way solenoid 424. Again, other line splitting valves or elements besides a three-way solenoid may alternatively be used in some arrangements. Second three-way solenoid 424 can be configured to feed steam water supply line 431 to facilitate automatic purging of steam wand 430 and also pressure relief water line 451 that feeds pressure relief box 450. This particular machine architecture can allow for less water intrusion into milk to be steamed by steam wand 430, which can result in less dilution of the milk being steamed. Drip tray 452 can be arranged to collect excess water or drips from steam wand 430 and pressure relief box 450. In some arrangements, pressure relief box 450 can be configured to slow the flow of high pressure water or steam such that the flow does not spray or splatter as it enters drip tray 452. Other common functionalities and operation of steam wand 430 (or other suitable steaming element), pressure relief box 450, and drip tray 452 will be readily appreciated by those of skill in the art.

Low volume boiler 440 can receive at its inlet preheated water from preheating component 420 via first three-way solenoid 422 along coffee function water line 441, heat the water internally, and deliver the heated water at its outlet along the outlet coffee function water line into another line splitting valve or element, such as third three-way solenoid 442. Again, other line splitting valves or elements besides a three-way solenoid may alternatively be used in some arrangements. Various functions and operating conditions of low volume boiler 440 are provided in greater detail above, notably that there can be a relatively small temperature gradient across the boiler that can then result in greater control of the water temperature in the boiler and substantially better thermal stability of the heated water that exits the boiler.

Third three-way solenoid 442 can provide heated water along coffee function water line 441 and along pressure relief water line 451 as shown. Third three-way solenoid 442 can allow for backpressure relief after pulling a shot of espresso at grouphead 446 and portafilter 448 by providing heated water along coffee function water line 441 while also having a pressure relief water line 451 that feeds into pressure relief box 450. Grouphead 446 can include a cartridge heater for even greater brewing temperature control in some embodiments, as set forth in greater detail below. Pressure sensor 444 can be used to provide pressure feedback along the coffee function water line 441 exiting the third three-way solenoid 442 to facilitate adjusting brewing pressure, as will be readily appreciated.

In addition to facilitating greater espresso brewing temperature and pressure controls, this arrangement using third three-way solenoid 442 can allow for easier routing maintenance and cleaning of boosted heating espresso machine 401. For example, the illustrated machine architecture can allow for greater access and flow of water and/or cleaning agents into various internal system parts while still providing fluid flow into pressure relief box 450 and thus drip tray 452. In various embodiments, some or all of water lines 411, 421, 431, 441, 451 can be fluid tubing formed from flexible or rigid materials, such as polytetrafluoroethylene tubing, for example. Other types of plastic or even stainless steel or other metal tubing can also be used.

Figure 5:
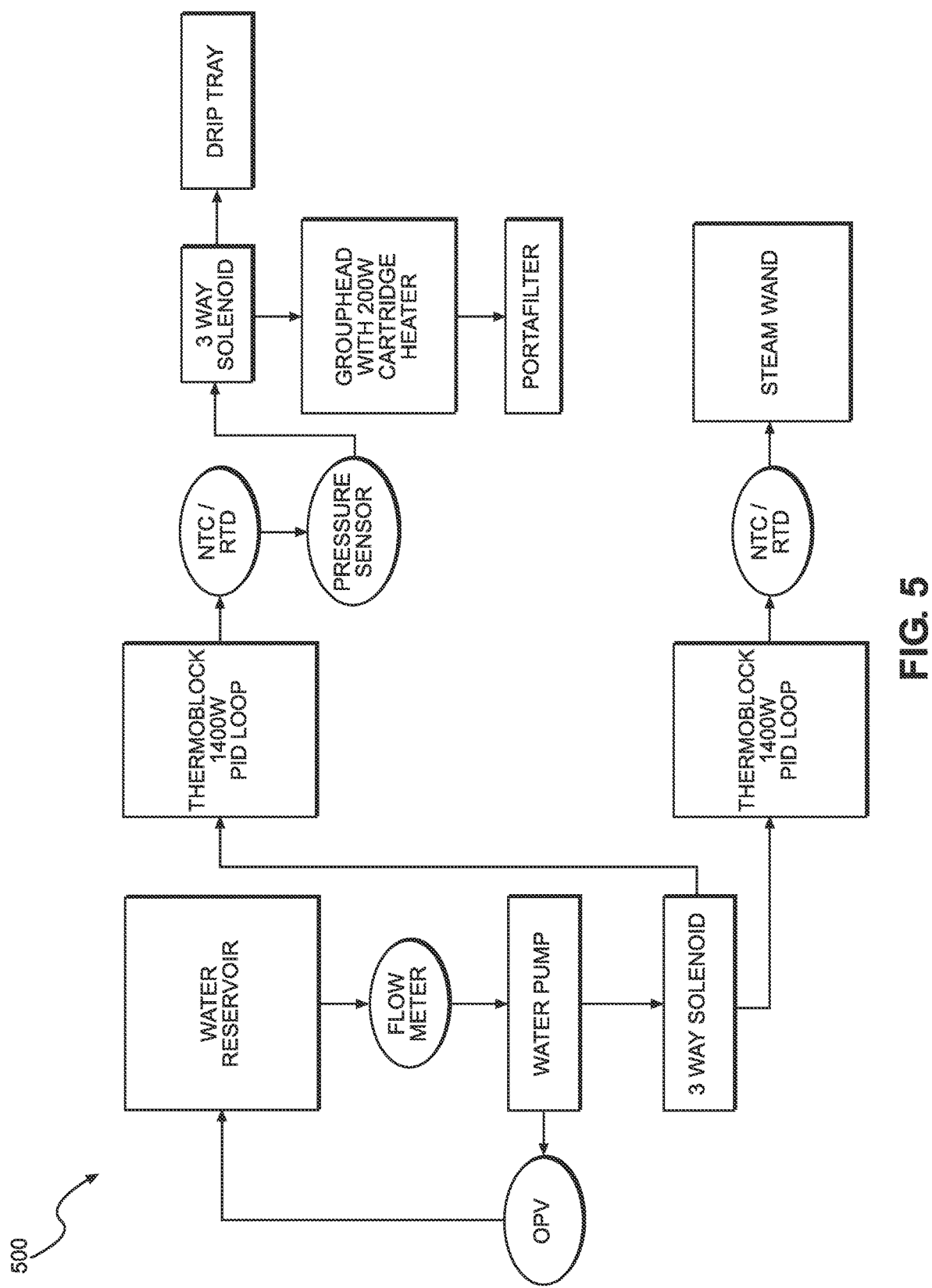
FIG. 5 illustrates a schematic diagram of an example alternative boosted heating espresso machine having multiple thermoblocks and a heated group head according to one embodiment of the present disclosure.

Next, FIG. 5 illustrates a schematic diagram of an example alternative boosted heating espresso machine having multiple thermoblocks and a heated group head. Boosted heating espresso machine 500 can also have a general architecture that combines advantages of the fast heat up ability of a thermoblock or other flash fluid heating device with thermal stability at the group head of the machine, such as by using a preheated group head. As shown, the architecture of boosted heated espresso machine 500 can be simpler and more cost efficient than boosted heating espresso machine 400 set forth above but may be less thermally stable.

In general, it is very difficult to achieve fine temperature control by just modulating the heating element of a flash fluid heating device. These devices have a thermal mass that is so large that the heating arrangement cannot respond quickly to changes, which is why thermoblock based espresso machines typically do not presume to have digital temperature controls and instead allow for broad +/−2 or 4 degree incremental changes. This lack of thermal stability in thermoblock and other flash fluid heating based espresso machines can again be overcome by using a boosted heating arrangement having a preheating component and a main or secondary heating component, such as that which is shown for boosted heated espresso machine 500.

Similar to foregoing embodiment 400, boosted heating espresso machine 500 can also include a water reservoir, flow meter, water pump, and overpressure valve arranged in a suitably operating combination prior to any heating components. Unlike foregoing embodiment 400, however, boosted heating espresso machine 500 can utilize separate thermoblocks for steaming and brewing functions. Here, the pump can feed directly into a multiway valve that can switch between steaming and brewing lines and functions for the pumped water. Again, this can be a 3-way solenoid valve in some arrangements. In other embodiments, this multiway valve can be a mechanical valve that is manually actuated by a user. Other arrangements are also possible.

Each separate line from the multiway valve can have its own dedicated thermoblock or other suitable flash fluid heating device for independent steaming and brewing functions. This arrangement can result in advantages such as no lag in thermoblock temperature when switching between steaming and brewing modes, for example, among other possible benefits. Each thermoblock can utilize a 1400 watt heating element, a PID control loop to modulate temperature control, and an NTC or RTD type temperature sensor, for example, although other suitable items be used.

Other architecture items for boosted heating espresso machine 500 can be identical or similar to those above for machine 400, as shown, which can similarly result in fast heat up times with improved thermal stability. Again, this can involve having a heated group head such that the group head and portafilter can be preheated to facilitate better thermal stability. In some arrangements, a small cartridge heater can inserted into the group head, such as a 200 watt cartridge heater, although other types and power level heaters can also be used.

Figure 6:
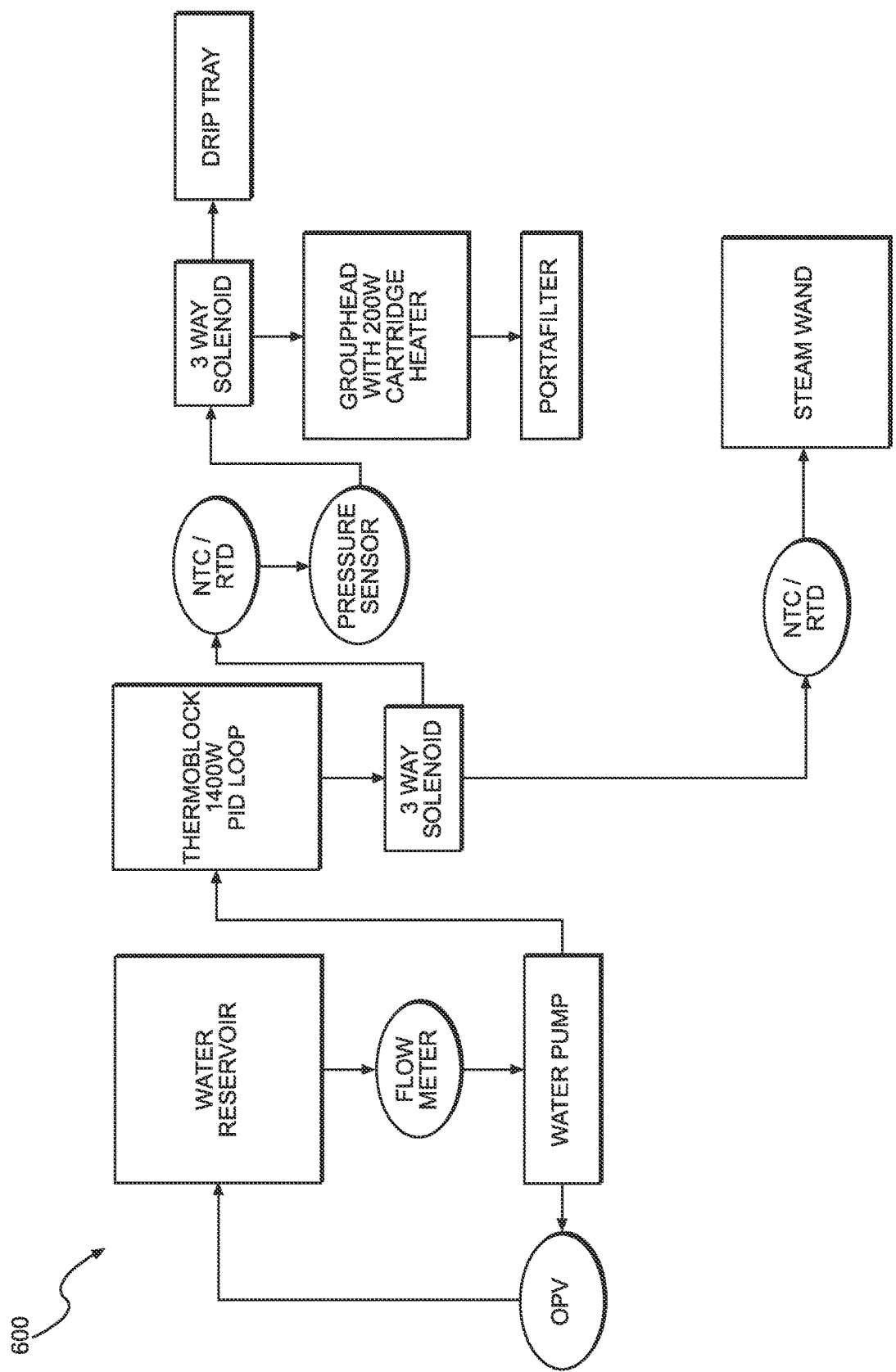
FIG. 6 illustrates a schematic diagram of an example alternative boosted heating espresso machine having a single thermoblock and a heated group head according to one embodiment of the present disclosure.

Continuing with FIG. 6 a schematic diagram is provided for an example alternative boosted heating espresso machine having a single thermoblock and a heated group head. Boosted heating espresso machine 600 can also have a general architecture that combines advantages of the fast heat up ability of a thermoblock or other flash fluid heating device with thermal stability at the group head of the machine, such as by using a preheated group head. As shown, the architecture of boosted heated espresso machine 600 can be even simpler and more cost efficient than boosted heating espresso machine 500 set forth above but may be even less thermally stable or inconvenient with respect to only one thermoblock being used instead of two.

As shown, a single thermoblock other suitable flash fluid heating device can used for both brewing and steaming with the 3-way solenoid valve or other multiway valve being placed after the single thermoblock. In this arrangement, there may be a cool down or wait period in order to get back to steady state when switching between steaming and brewing modes. Other system components can be identical or substantially similar to those shown for machine 500 above, particularly with respect to a heated group head that can be preheated in order to achieve greater thermal stability at the group head and portafilter.

Figure 7A:
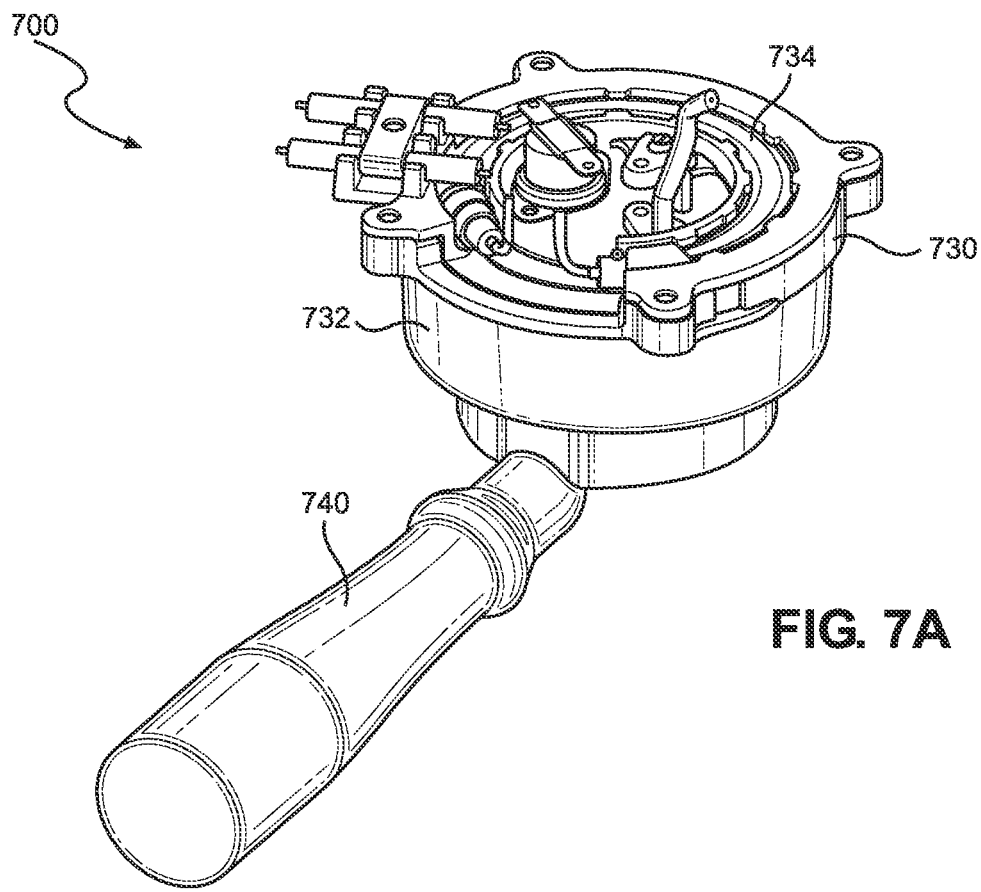
FIG. 7A illustrates in top perspective view an example portafilter and partial heated group head combination according to one embodiment of the present disclosure.
Figure 7B:
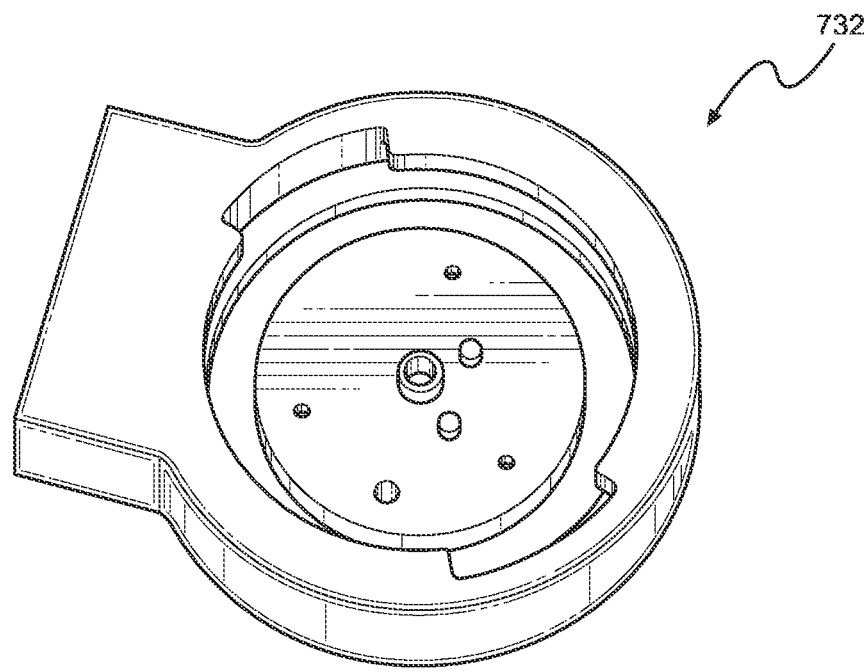
FIG. 7B illustrates in top perspective view an example outer housing for a heated group head according to one embodiment of the present disclosure.
Figure 7C:
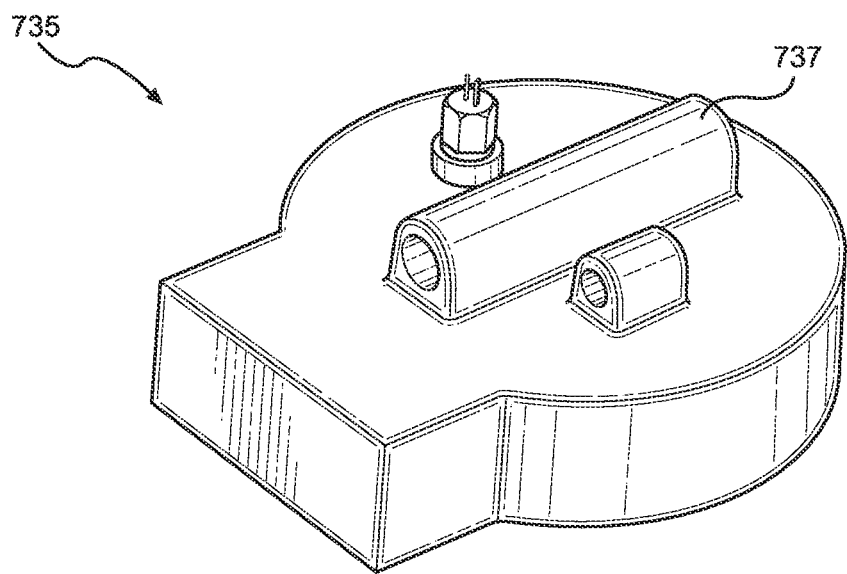
FIG. 7C illustrates in bottom perspective view the group head outer housing of FIG. 7B according to one embodiment of the present disclosure.
Figure 7D:
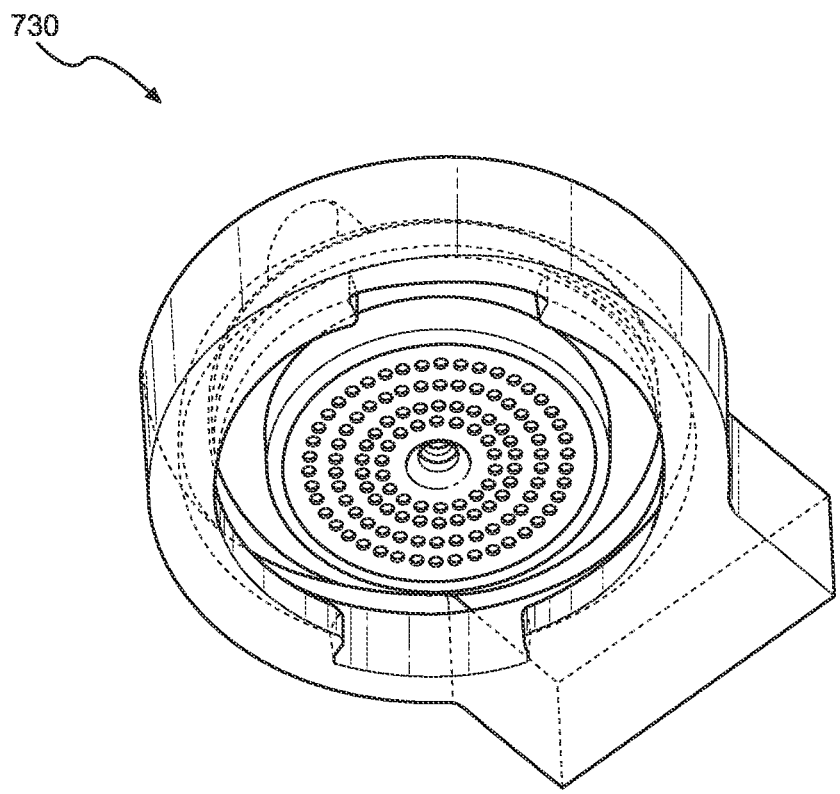
FIG. 7D illustrates in top perspective view an example shower screen within the group head outer housing of FIG. 7B according to one embodiment of the present disclosure.

FIG. 7A illustrates in top perspective view an example portafilter and partial heated group head combination, FIGS. 7B and 7C depict an example outer housing for a heated group head in top perspective and bottom perspective views, and FIG. 7D illustrates an example shower screen within a group head outer housing. Combination 700 shown in FIG. 7A can include a heated group head 730 and portafilter 740 coupled thereto. Heated group head 730 can include an outer housing 732 and a ring shaped heating element 734 contained therein, among other various components and items. Heated group head 730 provides one possible example architecture that provides for independent heating of a group head to result in further improved thermal stability while allowing for a variety of industrial design options for heating the group head. For example, the disclosed arrangement may involve not bolting or otherwise affixing a heating component such as a boiler or thermoblock to the group head so as to defeat the ability to independently preheat or heat the group head effectively.

While one type of heated group head 730 having a ring shaped heating element is shown for purposes of illustration in FIG. 7A, an outer housing 735 for an alternative type of heated group head is shown in FIG. 7C. This outer housing 735 can have a cavity 737 or other holding region formed along a bottom surface thereof, which region can be designed to hold a small cartridge heating element therein. Other types of heating arrangements and supporting components or items within a heated group head are also possible, as will be readily appreciated.

Various features in heated group head 730 can be designed to provide more even water distribution at lower flow rates and pressures than in typical inexpensive or small scale espresso machines. On many such machines, water is typically pumped through a dispersion block onto a shower screen offset from a center hole. This may be considered acceptable for medium and dark roasted espresso where a near immediate 9 bars of pressure fill the group head and saturates the espresso. For lightly roasted coffee, however, preinfusion and puck expansion are critical for optimal extraction and flavor. When infusing the puck at lower pressures, the water distribution becomes uneven and favors a side of the portafilter, which can lead to uneven extraction. A more even distribution of water can be realized by using the shower screen arrangement shown within the group head 730 of FIG. 7D, for example.

Figure 8:
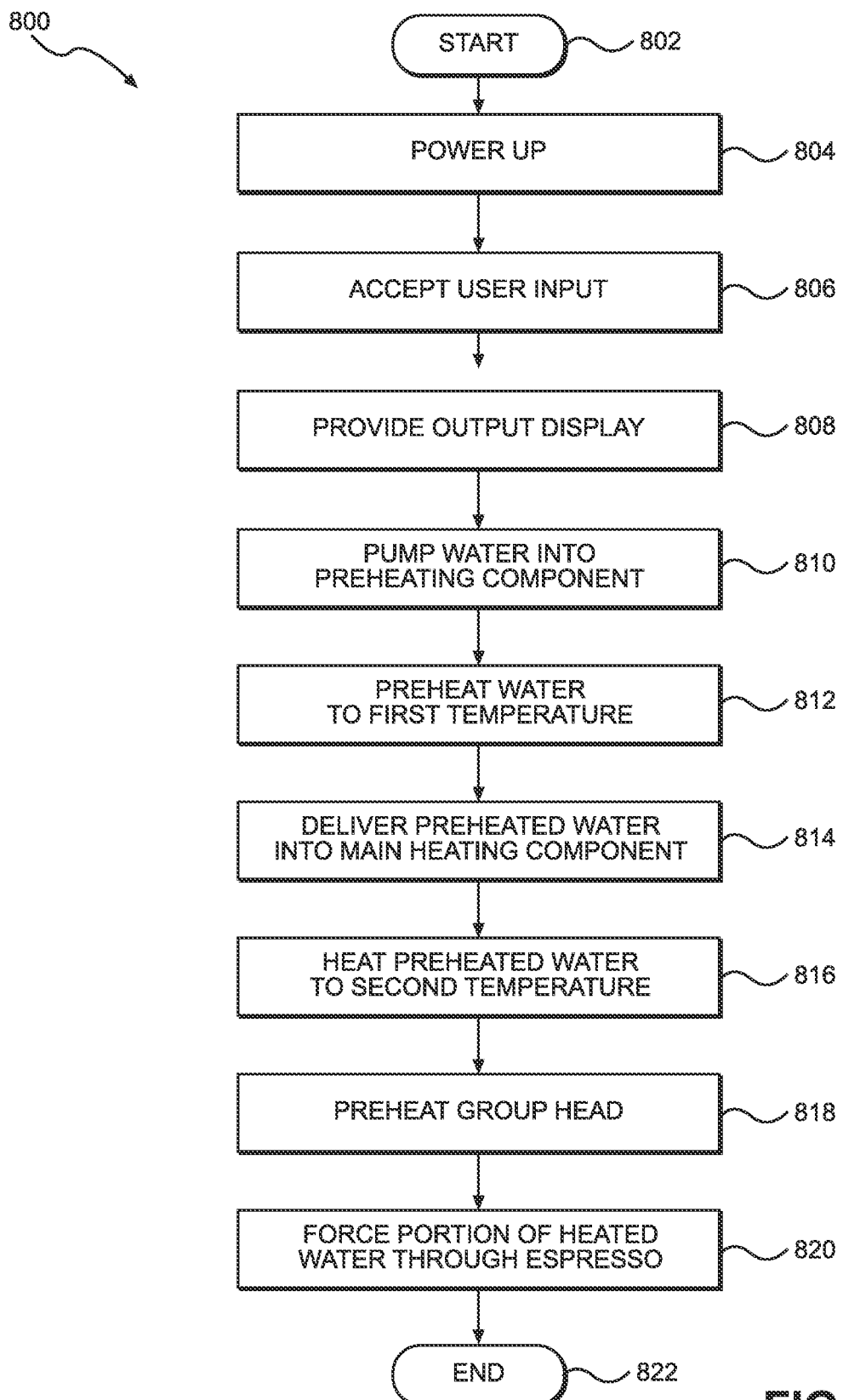
FIG. 8 illustrates a flowchart of an example detailed method of preparing an espresso beverage according to one embodiment of the present disclosure.

FIG. 8 illustrates a flowchart of an example detailed method 800 of preparing an espresso beverage. As in the case of summary method 300 above, detailed method 800 can represent steps performed by an espresso machine or other suitable system, and it will be understood that various other steps, features, and details of such a method are not provided here for purposes of simplicity. Some or all of the steps in detailed method 800 can be performed automatically, such as by an espresso machine or system as disclosed herein, and it will be understood that other steps and functions of an overall method of preparing an espresso beverage can be conducted manually by a user who is using the espresso machine or system. It will also be understood that not all steps of detailed method 800 need to be performed in a given situation.

After a start step 802, a first process step 804 can involve powering up the espresso machine or other suitable device or system. Process step 804 can be automatically performed by the espresso machine or system, and this can be done in response to a user input to turn on the device, such as by way of an automated timer or other scheduled event, or through any other suitable way to initiate device power up.

At a following process step 806, a user input can be accepted by the espresso machine or system. A subsequent process step 808 can involve providing a suitable output display to the user, which can reflect a current machine operating mode or state as well as one or more user selected settings. Other items such as water fill level and current pressure and temperature readings may also be provided on an output display. Process steps 806 and 808 can be automatically performed, such as by a processor or other controller located internally within the espresso machine or system and configured to accept and process user input as well as to provide output to a display on the espresso machine or other system device.

A following process step 810 can involve pumping water into a preheating component at the espresso machine or system. This can include pressurizing the pumped water. Process step 810 can be automatically performed by the espresso machine or system, such as by a water pump or other typical water providing arrangement that may also include a water reservoir, flow meter, and overpressure valve.

At a following process step 812, the water can be preheated to a first temperature, which can be done within the preheating component. Process step 812 can be automatically performed by the espresso machine or system, such as by an automatically run thermoblock or other flash fluid heating element. This can involve preheating the water to a first temperature that is at or above about 50° C. or more narrowly at or above about 90° C., for example, although other temperatures are also possible.

At the next process step 814, the preheated water can be delivered into a main heating component. Process step 814 can be automatically performed by the espresso machine or system, such as by fluid delivery or feed lines that couple the preheating component to the main heating component and pressure from the pump that forces the water through the preheating component and the fluid delivery lines. This can involve a continuous flow of pressurized water from the pump and through the preheating component and all fluid feed lines.

At a subsequent process step 816, the preheated water can be heated to a second temperature, which can be done within the main heating component. Process step 816 can be automatically performed by the espresso machine or system, such as by an automatically run small volume boiler or other similar component. This can involve heating the water to a second temperature that is equal to or greater than the first temperature. This second temperature can be between about 85-100° C., or more specifically between about 91-97° C., for example, although other temperatures are also possible. In particular, the main heating component can effectively serve as both a heating component and thermally stabilizing component, such that the water temperature input to it from the preheating component can fluctuate several degrees up and down, the water temperature exiting the main heating component is much more thermally stable.

At a next process step 818, the group head can be preheated. This can be done to bring the group head to a temperature that is at or substantially close to the second temperature such that thermal equilibrium can be maintained when the shot or other portion of water is forced through the group head and portafilter. As will be readily appreciated, this can result in the group head, portafilter, and espresso puck all being preheated together as a combined thermal unit. Process step 818 can be performed automatically, such as by an overall espresso machine or system control system being configured to preheat the group head as part of an automated process that also heats the preheating component and the main heating component.

At a following process step 820, a portion of the heated water can be forced through espresso grounds. This can involve releasing the portion of heated water from the main heating component through a feed line into a group head and through the group head into a portafilter having a coffee puck formed therein, for example. The portion of heated water can have the volume of a typical espresso shot or any other suitable volume. Process step 820 can be automatically performed by the espresso machine or system, such as by an automatically run shot pulling subsystem that may include a valve, group head, portafilter, and other typical espresso machine items. In some arrangements, the portion or "shot" of heated water can remain substantially at or within about 1° C. of the second temperature as it is forced through the espresso grounds, although other temperature declines and ranges are also possible. This can be due to the improved thermal stability in the exit temperature from the main heating component as well as one or more other factors, such as a preheated group head and portafilter arrangement, for example. Detailed method 800 can then end at end step 822.

For the foregoing detailed method 800, it will be appreciated that not all process steps are necessary, and that other process steps and details may be added. Furthermore, the order of steps may be altered in some cases, and some steps may be performed simultaneously. For example, step 818 may be performed before or simultaneously with steps 810-816 so that the group head is already heated to the right temperature before heated water is ever delivered from the small volume boiler or other main heating component. In addition, many steps can be performed simultaneously as part of a continuous process involving pulls of multiple consecutive espresso shots. Other variations and extrapolations of detailed method 800 will also be readily appreciated by those of skill in the art.

Figure 9:
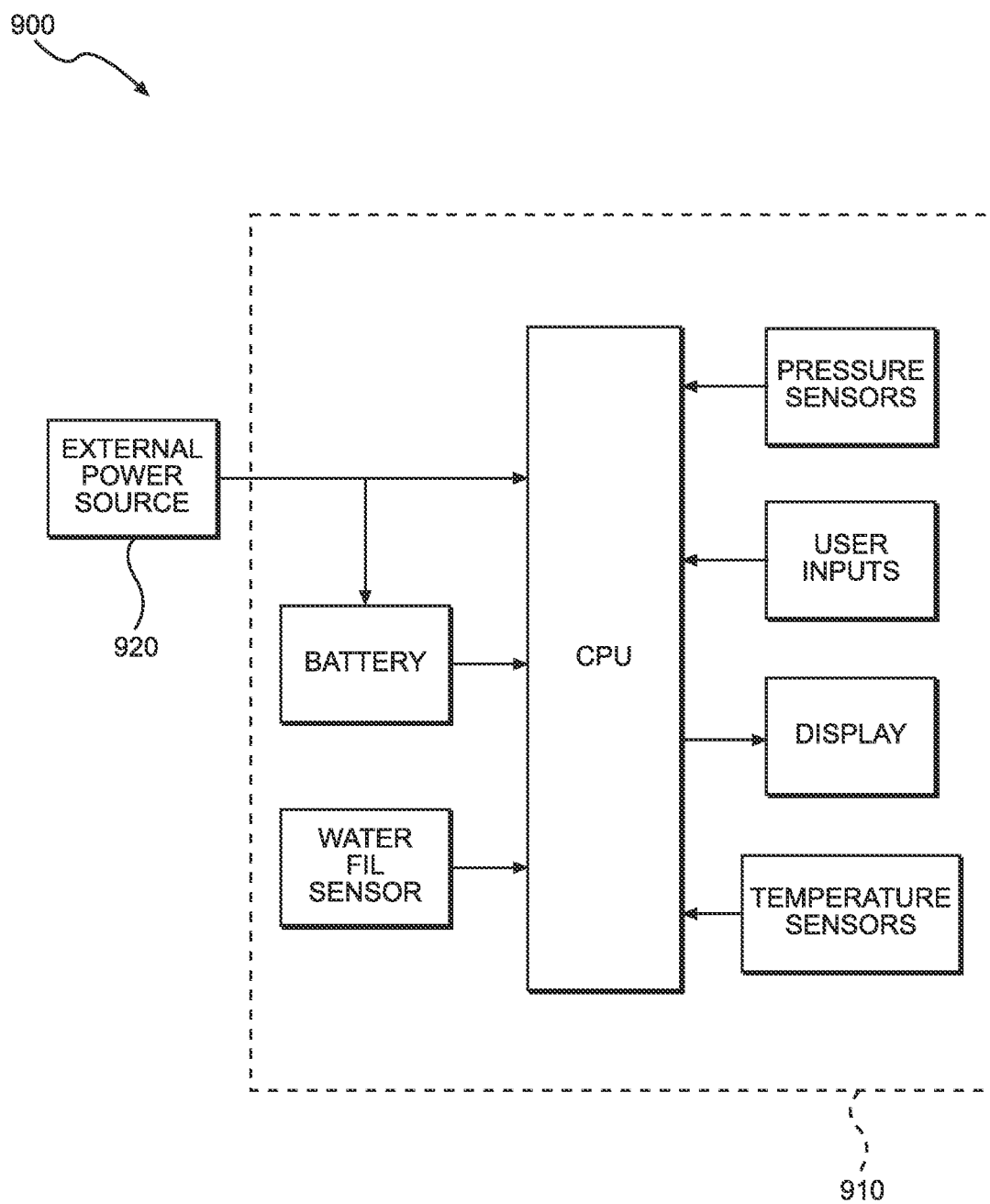
FIG. 9 illustrates a schematic diagram of electronic components for a boosted heating espresso machine according to one embodiment of the present disclosure.

Finally, FIG. 9 illustrates a schematic diagram of electronic components for a boosted heating espresso machine or system. Electronic component arrangement 900 can generally include multiple internal components 910 contained within or located about an outer housing of the espresso machine itself, as well as one or more external components 920 located outside of the espresso machine or other suitable espresso system. Internal components can include user input components or devices, such as a start button and one or more user input items that can be buttons, dials, touch screens, or the like. Internal components can also include a display to provide statuses, selected settings, or other outputs to a user, one or more pressure sensors, one or more temperature sensors, and a battery or other internal power source. Each of these internal components 910 can be electrically and/or communicatively coupled to a CPU or other suitable processing board or system, which can include one or more processors, memory units, and/or other circuitry items.

External components can include an external power source and/or one or more additional items, such as, for example, a communication network, additional memory storage, outside user input components, and/or outside display components. Other components, items, and features may be included for a boosted heating espresso machine or system configured to prepare an espresso beverage, as will be appreciated by those of skill in the art.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An espresso machine, comprising:
   a main body having an outer housing and internal components contained therein;
   a pump configured to provide pressurized water through the main body;
   a preheating component located within the main body and arranged to receive the pressurized water from the pump, wherein the preheating component is configured to preheat the pressurized water to a first temperature and to deliver the preheated water;
   a low volume boiler located within the main body, the low volume boiler having a heating arrangement, a water inlet, an internal volume of 250 mL or less, and a water outlet, wherein the low volume boiler is configured to receive the preheated water from the preheating component at the water inlet, to heat the preheated water within the internal volume to a second temperature that is equal to or greater than the first temperature using the heating arrangement, and to deliver a portion of the heated water out of the water outlet such that heating the preheated water within the internal volume creates a small temperature gradient across the low volume boiler from the water inlet to the water outlet; and
   a group head located proximate the main body, the group head being arranged to couple with a portafilter having espresso grounds therein, to receive the portion of heated water from the low volume boiler, and to force the portion of heated water through the espresso grounds in the portafilter, wherein the portion of heated water remains substantially at or within 1° C. of the second temperature as it exits the group head.

2. The espresso machine of claim 1, wherein the first temperature is between 50-100° C. and the second temperature is between 85-100° C.

3. The espresso machine of claim 2, wherein the first temperature is between 90-96° C. and the second temperature is between 91-97° C.

4. The espresso machine of claim 1, wherein the preheating component is a flash fluid heating device.

5. The espresso machine of claim 1, wherein the heating arrangement of the low volume boiler includes a heating element, a temperature sensor, a feedback loop, and a controller.

6. The espresso machine of claim 1, wherein the group head includes a heating element configured to preheat the group head and portafilter before the portion of heated water is delivered thereto.

7. The espresso machine of claim 6, wherein the heating element of the group head is further configured to heat the group head to substantially maintain the temperature of the portion of heated water passing therethrough.

8. The espresso machine of claim 1, further comprising:
   a water reservoir coupled to the pump, wherein the water reservoir is configured to store water therein and to provide the water to the pump;
   an overpressure valve coupled to the water reservoir and the pump, wherein the overpressure valve is configured to regulate the pressure of the water provided by the pump; and
   a flowmeter configured to measure water flow from the water reservoir to the pump.

9. The espresso machine of claim 1, further comprising:
   a multiway valve located between and coupled to both of the preheating component and the low volume boiler, wherein the multiway valve is configured to allow a partial diversion of the preheated water from the preheating component; and
   a steam wand coupled to the multiway valve and configured to receive the partial diversion of preheated water.

10. An espresso producing system, the system comprising:
   a pump configured to provide pressurized water;
   a first flash fluid heating device arranged to receive the pressurized water from the pump, wherein the first flash fluid heating device is configured to preheat the pressurized water to a first temperature and to deliver the preheated water;
   a low volume boiler having an internal volume of 250 mL or less, wherein the low volume boiler is configured to receive the preheated water from the first flash fluid heating device and to heat the preheated water within the internal volume to a temperature that is equal to or greater than the first temperature such that heating the preheated water within the internal volume creates a small temperature gradient across the low volume boiler from its water inlet to its water outlet; and a group head arranged to couple with a portafilter having espresso grounds therein, to receive the heated water from the low volume boiler, and to force the water through the espresso grounds in the portafilter, wherein the group head includes a heating element configured to heat the heated water within the group head to a second temperature that is equal to or greater than the first temperature such that the heated water remains substantially at or within 1° C. of the second temperature as it exits the group head.

11. The system of claim 10, further comprising:
a water reservoir coupled to the pump, wherein the water reservoir is configured to store water therein and to provide the water to the pump;
an overpressure valve coupled to the water reservoir and the pump, wherein the overpressure valve is configured to regulate the pressure of the water provided by the pump; and
a flowmeter configured to measure water flow from the water reservoir to the pump.

12. The system of claim 10, further comprising:
a multiway valve located between and coupled to both of the first flash fluid heating device and the group head, wherein the multiway valve is configured to allow a partial diversion of the preheated water from the first flash fluid heating device; and
a steam wand coupled to the multiway valve and configured to receive the partial diversion of preheated water.

13. The system of claim 10, further comprising:
a multiway valve located between and coupled to both of the pump and the first flash fluid heating device, wherein the multiway valve is configured to allow a partial diversion of the pressurized water from the pump;
a second flash fluid heating device arranged to receive the partial diversion of pressurized water from the multiway valve, wherein the second flash fluid heating device is configured to heat the partial diversion of pressurized water independently of the first flash fluid heating device; and
a steam wand coupled to the second flash fluid heating device and configured to receive the heated partial diversion of water from the second flash fluid heating device.

14. A method of preparing an espresso beverage using the espresso machine of claim 1, the method comprising:
pumping water into the preheating component of the espresso machine;
preheating the water within the preheating component to a first temperature, wherein the first temperature is at or above 50° C.;
delivering the preheated water from the preheating component into a main heating component, wherein the main heating component is the low volume boiler of the espresso machine;
heating the preheated water within the main heating component to a second temperature, wherein the second temperature is equal to or greater than the first temperature such that heating the preheated water creates a small temperature gradient across the low volume boiler from its water inlet to its water outlet; and
forcing a portion of the heated water from the main heating component through espresso grounds, wherein the portion of heated water remains substantially at or within 1° C. of the second temperature as it is forced through the espresso grounds.

15. The method of claim 14, wherein the preheating component is a flash fluid heating device.

16. The method of claim 14, further comprising the steps of: providing the heated water from the main heating component into a group head before forcing the heated water through espresso grounds; and preheating the group head before providing the heated water into the group head.

17. The method of claim 14, wherein the first temperature is between 50-100° C. and the second temperature is between 85-100° C.

18. The espresso machine of claim 1, wherein the pump is configured to provide pressurized water at a pressure of 9 bars.

19. The espresso machine of claim 1, wherein the low volume boiler has an internal volume between 200-250 mL.

20. The espresso machine of claim 1, wherein the espresso machine is configured such that the heated water output from the small volume boiler fluctuates less than 0.1° C.

21. The espresso machine of claim 1, wherein the second temperature is 0 to 1° C. greater than the first temperature.

22. The espresso machine of claim 1, wherein the low volume boiler is configured to bring water to a brew ready temperature in less than 1 minute.

23. The espresso machine of claim 1, wherein the espresso machine is configured to reach thermal equilibrium in 5-10 minutes from startup.

* * * * *